US006291023B1

(12) United States Patent
Nigam

(10) Patent No.: US 6,291,023 B1
(45) Date of Patent: Sep. 18, 2001

(54) METHOD AND COMPOSITION FOR TEXTILE PRINTING

(75) Inventor: Asutosh Nigam, Fremont, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/282,753

(22) Filed: Mar. 31, 1999

Related U.S. Application Data

(60) Provisional application No. 60/082,697, filed on Apr. 22, 1998.

(51) Int. Cl.[7] .......... B05D 5/04

(52) U.S. Cl. .......... 427/389.9; 427/412

(58) Field of Search .......... 427/389.9, 412

(56) References Cited

U.S. PATENT DOCUMENTS

| | | | |
|---|---|---|---|
| Re. 34,486 | 12/1993 | Waldmann | 528/422 |
| 4,341,887 | 7/1982 | Buriks et al. | 526/263 |
| 4,410,652 | 10/1983 | Robinson et al. | 524/195 |
| 4,439,208 | 3/1984 | Moser et al. | 8/556 |
| 4,554,181 | 11/1985 | Cousin et al. | 427/261 |
| 4,604,101 | 8/1986 | Kissling et al. | 8/551 |
| 4,645,511 | 2/1987 | Heller et al. | 8/549 |
| 4,689,418 | 8/1987 | Buriks et al. | 548/952 |
| 4,718,918 | 1/1988 | Heller et al. | 8/495 |
| 4,764,585 | 8/1988 | Heller et al. | 528/233 |
| 4,872,951 | 10/1989 | Maliczyszyn et al. | 162/135 |
| 4,913,705 | 4/1990 | Schlick et al. | 8/532 |
| 5,169,441 | 12/1992 | Lauzon | 106/416 |
| 5,221,699 * | 6/1993 | Nachfolger et al. | 8/554 |
| 5,296,541 | 3/1994 | Swarup et al. | 524/556 |
| 5,304,587 | 4/1994 | Oswald et al. | 523/161 |
| 5,318,669 | 6/1994 | Dasgupta | 162/164.3 |
| 5,384,368 | 1/1995 | Date et al. | 525/186 |
| 5,633,300 | 5/1997 | Dasgupta | 524/55 |
| 5,659,011 | 8/1997 | Waldmann | 528/422 |

FOREIGN PATENT DOCUMENTS

| | | |
|---|---|---|
| 195 27 100 | 1/1997 | (DE) . |
| 0286597 | 10/1988 | (EP) . |
| 2473052 | 7/1981 | (FR) . |
| 1126649 * | 9/1968 | (GB) . |
| 61-98580 | 5/1986 | (JP) . |
| 9-254529 | 9/1997 | (JP) . |

OTHER PUBLICATIONS

Cardamone et al, Book Papers—Int. Conf. Exhib. AATCC, pp. 505–519, 1996.*

Cardamone et al, Text. Chem. Color., 28(12), pp. 19–24, 1996.*

Cardamone et al, Text. Chem. Color., 29(9) pp. 30–36, 1997.*

* cited by examiner

*Primary Examiner*—Erma Cameron

(74) *Attorney, Agent, or Firm*—Dianne E. Reed; J. Elin Hartrum; Reed & Associates

(57) ABSTRACT

The present invention features novel methods and compositions for coating textile substrates, wherein the coating compositions are composed of a coating agent selected from one of (a) an azetidinium polymer, (b) a guanidine polymer, (c) a mixture of an azetidinium polymer and a guanidine polymer, and (d) a copolymer of an azetidinium monomer and a guanidine monomer. Textile substrates coated with the compositions provide high quality printed images when printed with an ink containing a reactive dye having ionizable and/or nucleophilic groups capable of reacting with the coating agent in the textile coating composition. Images printed on a textile substrate coated with a coating composition of the invention are bleed-resistant, water-resistant (e.g., water-fast), detergent-resistant (e.g., detergent-fast), and/or are characterized by an enhanced chroma and hue.

41 Claims, No Drawings

METHOD AND COMPOSITION FOR TEXTILE PRINTING

CROSS-REFERENCE TO RELATED APPLICATIONS

This application claims priority to U.S. provisional patent application 60/082,697, filed Apr. 22, 1998.

TECHNICAL FIELD

The present invention is directed to treatment of textiles, and more particularly relates to a method and composition for treating textiles to improve the quality of images printed thereon.

BACKGROUND

Current textile printing technologies are deficient in meeting modern, time-driven, demand-responsive manufacturing strategies. In general, the conventional method of printing on textiles involves crosslinking a colorant to the cellulosic fiber of the textile itself. This approach is limited in that it relies on processes that involve multiple, time-consuming steps. Furthermore, the types of substrates and colorants that can be used are limited.

One approach for increasing textile printing speed involves the use of inkjet printing. Inkjet printers are very popular, due at least in part to their reliability, relatively quiet operation, versatility, graphics capability, print quality, and low cost. Moreover, inkjet printers have made possible "on demand" color printing without the need for complicated devices. Because inkjet printing has become so popular in both home and commercial use, several water-soluble inks are available. The inks are typically composed of water and a colorant, usually a dye or pigment dispersion, and often contain a number of additives for imparting certain features to the ink, e.g., improved stability and flow, smear resistance, and the like.

Unfortunately, the use of inkjet printing techniques to print on textiles has met with several problems. First, and in spite of the large number of inkjet inks currently available, inkjet printed images on textiles are often of low quality. For example, the printed images often smear upon handling, exhibit bleed (the intrusion of one color into an adjacent color), are moisture sensitive, and are dull, i.e., colored inks when printed fail to accurately produce the expected hues. Moreover, the printed images are often neither water-fast nor detergent-resistant, resulting in fading of the printed image after washing. Printed textile images with these drawbacks are wholly unacceptable to the textile industry, which requires not only that the image be both water-resistant and detergent-resistant, but also that the colors and hues are those deemed acceptable in the textile field. In addition, the textile industry also demands that while the colorant of the ink must adhere tenaciously to the substrate, it also must not alter the desirable hand properties of the substrate. This combination of requirements is very difficult to accomplish.

Although there have been developments and improvements in the field of textile printing, the methods currently used still do not provide optimum results. Thus, there is a need in the art for a textile treatment that can overcome the above problems, is relatively inexpensive, and can generally provide a high quality inkjet printed image on a textile substrate, preferably using presently available dyes. The present invention is addressed to this need.

SUMMARY OF THE INVENTION

The present invention features a novel method and composition for coating textile substrates, wherein the composition is composed of a coating agent selected from one of (a) an azetidinium polymer, (b) a guanidine polymer, (c) a mixture of an azetidinium polymer and a guanidine polymer, and (d) a copolymer of an azetidinium monomer and a guanidine monomer. When applied to a textile substrate, the coating composition provides a coated textile substrate that yields high quality printed images when printed with an ink containing a reactive dye having ionizable and/or nucleophilic groups capable of reacting with the coating agent. Images printed on a textile substrate coated with the coating composition of the invention are bleed-resistant, water-resistant (e.g., water-fast), detergent-resistant (e.g., detergent-fast), and/or are characterized by an enhanced chroma and hue.

It is a primary object of the invention to address the above-mentioned need in the art by providing a coating composition that can be readily applied to a variety of textile substrates and that efficiently binds colorant upon printing, thus providing an economical, efficient means for processing textiles so as to facilitate production of a high quality printed image.

Another object of the invention is to provide a printed textile substrate that is of high quality (particularly with respect to optical density and brightness of the printed image), and that is bleed-resistant, water-resistant (e.g., water-fast), and detergent-resistant (e.g., detergent-fast).

Still another object of the invention is to provide a method for coating textiles using the coating compositions of the invention.

Still an additional object of the invention is to provide a method for printing on a coated textile substrate to provide water-resistant (e.g., water-fast) and/or detergent-resistant (e.g., detergent-fast) images thereon.

Additional objects, advantages and novel features of the invention will be set forth in part in the description which follows, and in part will become apparent to those skilled in the art upon examination of the following, or may be learned by practice of the invention.

DETAILED DESCRIPTION OF THE INVENTION

Definitions and Nomenclature

It must be noted that, as used in the specification and the appended claimnr the singular forms "a," "an" and "the" include plural referents unless the context clearly dictates otherwise. Thus, for example, reference to "a colorant-reactive component" in a composition means that more than one colorant-reactive component can be present in the composition, reference to "a colorant" in a composition means that more than one colorant can be present in the composition, reference to "a polymer" includes combinations of different polymers, and the like.

"Textile" or "textile substrate" as used herein refers to any cellulose-based or non-cellulose based textile material suitable for use as a printing substrate in connection with the coatings and/or methods of the invention. In general, where appropriate, the textile substrate has been sized, internally and/or externally, prior to application of the compositions of the invention.

The terms "treated textile substrate," "coated textile substrate," "treated textile substrate," and "coated textile substrate" are generally used herein to refer to a textile substrate that is treated with, i.e., has applied to its surface and/or is partially or wholly saturated with, a coating of the present invention, to provide for improved printing performance, particularly with respect to water resistance (e.g., water-fastness), detergent resistance (e.g., detergent-fastness), brightness, and the like. The coating may be applied as a pretreatment, i.e., prior to printing, simultaneously with printing, or as an after-treatment. Preferably, the coating is applied to the substrate in a separate coating operation prior to printing, typically in amounts ranging from fifty (50) to five hundred (500) pounds per ton of substrate. "Coating composition" as used herein is generally meant to refer to a composition of the invention comprised of a coating agent as described herein. The coating composition may contain components in addition to the coating agents described herein, such as binders, colorants, etc. The use of the term "coating" in the phrase "coating composition" is not limited to the presence of the composition on a surface of a textile substrate, but is also intended to encompass a textile substrate that has been infiltrated with the composition, such that the composition is present within the fibers of the treated substrate. Unless specifically indicated otherwise, "coating" in reference to the coating compositions and coating agents of the invention is used only as a term of convenience, and is not meant to be limiting as to the manner of application of the compositions of the invention, or their final location on and/or within a treated textile substrate.

"Aqueous based ink" refers to an ink composed of an aqueous carrier medium and a colorant, such as a dye or a pigment dispersion. An aqueous carrier medium is composed of water or a mixture of water and one or more water-soluble organic solvents. Exemplary aqueous based ink compositions are described in detail below.

"Colorant" as used herein is meant to encompass dyes, pigments, stains, and the like compatible for use with the coating agents and compositions of the invention.

The term "colorant-reactive component" as used herein refers to a component (e.g., a chemical moiety) of a coating agent of the invention that is capable of reacting with a selected colorant, particularly a colorant having a nucleophilic and/or ionizable group, to form a coating agent-colorant complex. The coating agent-colorant complex is formed through either a covalent, electrostatic, or ionic association between the colorant-reactive coating agent and the colorant. When a coating agent having a colorant-reactive component and a selected colorant form a coating agent-colorant complex in the context of a printed image on a textile substrate, the association between the colorant and the color-reactive component of the coating agent is effective to impart advantageous qualities to the printed image on the textile substrate, particularly with respect to water resistance, detergent resistance, enhanced optical density, enhanced brightness, and the like.

The term "organic solvent" is used herein in its conventional sense to refer to a liquid organic compound, typically a monomeric organic material in the form of a liquid, preferably a relatively nonviscous liquid, the molecular structure of which contains hydrogen atoms, carbon atoms, and optionally other atoms as well, and which is capable of dissolving solids, gases or liquids.

The term "significant", as when used with reference to "significantly enhanced brightness" or "significantly improved water resistance" generally refers to a difference in a quantifiable, measurable, or otherwise detectable parameter, e.g., optical density, LAB graphs (color sphere), dot spread, bleed through, between the two groups being compared (e.g., untreated versus treated textile substrates) that is statistically significant using standard statistical tests. For example, the degree of visual wicking or water resistance in a treated textile substrate as detected in a print assay may be quantified using standard methods, and the degree of wicking or water resistance under different conditions can be compared for both treated and untreated textile substrates to detect statistically significant differences.

The term "fluid resistance" is used herein to describe the resistance of a textile substrate to penetration by a fluid, with the term "water resistance" specifically referring to resistance of a textile substrate to penetration by a fluid.

The term "water-fast" is used herein to describe a form of water resistance, and is normally used to refer to the nature of the ink composition after drying on a substrate. In general, "water-fast" means that the dried composition is substantially insoluble in water, such that upon contact with water, the dried ink retains at least about 70%, preferably at least about 85%, and more preferably at least about 95%, of optical density.

The term "detergent-resistant" is used herein to describe the nature of the ink composition after exposure to detergent (e.g., during washing). "Detergent-fast" is intended to refer to a particular high-level of "detergent resistance," and is generally used to mean that the dried composition is substantially insoluble in water, such that upon contact with water, the dried ink retains at least about 70%, preferably at least about 85%, and more preferably at least about 95%, of optical density.

The term "bleed resistance" is meant to refer to the retardation of the penetration of water into a textile substrate, which retardation is associated with creation of a low energy hydrophobic surface at the textile fiber-water interface which increases the contact angle formed between a drop of liquid and the surface, and thus decreases the wettability. Contact angles have been shown to be sensitive to molecular packing, surface morphology, and chemical constitution of the textile substrate and any components added thereto.

The term "rub resistance" is normally meant to refer to a characteristic of the ink composition after drying on a substrate, more specifically, the ability of a printed image to remain associated with the substrate upon which it is printed despite application of force (e.g., rubbing) to the printed image. In general, "rub-resistant" means that the dried ink composition is substantially resistant to rubbing force so that the dried ink retains at least about 70%, preferably at least about 85%, and more preferably at least about 95%, of optical density after rubbing of the printed image.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. The term "lower alkyl" intends an alkyl group of 1 to 6 carbon atoms, preferably 1 to 4 carbon atoms.

The term "alkylene" as used herein refers to a difunctional, branched or unbranched saturated hydrocarbon group of 1 to 24 carbon atoms, including without limitation methylene, ethylene, ethane- 1,1-diyl, propane-2,2-diyl, propane-1,3-diyl, butane- 1,3-diyl, and the like. "Lower alkylene" refers to an alkylene group of 1 to 6 carbon atoms.

The term "alkoxy" as used herein intends an alkyl group bound through a single, terminal ether linkage; that is, an "alkoxy" group may be defined as —OR where R is alkyl as defined above. A "lower alkoxy" group intends an alkoxy group containing 1 to 6 carbon atoms.

"Halo" or "halogen" refers to fluoro, chloro, bromo or iodo, and usually relates to halo substitution for a hydrogen atom in an organic compound.

The term "polymer" is used herein in its conventional sense to refer to a compound having two or more monomer units, and is intended to include homopolymers as well as copolymers. The term "monomer" is used herein to refer to compounds which are not polymeric.

"Optionally" or "optionally" means that the subsequently described event or circumstance may or may not occur, and that the description includes instances where said event or circumstance occurs and instances where it does not. For example, the phrase "optionally substituted" aromatic ring means that the aromatic ring may or may not be substituted and that the description includes both an unsubstituted aromatic ring and an aromatic ring bearing one or more substituents.

Overview of the Invention

The present invention is based upon the discovery that a coating composition containing a coating agent that is (a) an azetidinium polymer, (b) a guanidine polymer, (c) a mixture of an azetidinium polymer and a guanidine polymer, or (d) a copolymer of an azetidinium monomer and a guanidine monomer, can be used to treat a textile substrate to significantly improve the quality of images printed thereon. Textile substrate that has been treated with a coating agent of the invention can provide high quality printed images having improved color fastness, that is, the printed images do not run when exposed to moisture and/or detergent, as a result of the substantially non-reversible binding of aqueous colorants to the image-enhancing agent present in the image-enhancing composition. These images are therefore characterized as "water-resistant" (e.g., water-fast) and/or detergent-resistant (e.g., detergent-fast) due to the characteristics of the printed image following exposure to water and/or detergent.

The coated textile substrates of the invention can be used with conventional textile printing processes, or may be used with digital printing techniques such as inkjet printing (including drop-on-demand printing and continuous printing), to provide highly brilliant, printed images that are significantly improved in color quality, for example, with respect to chroma and hue. The coating agents and compositions of the invention thus provide a number of advantages over conventional textile printing methods.

The coating agents, compositions, methods of treating textile substrates using the compositions described herein, and other features of the invention are described in greater detail below.

Coating Compositions

In general, the coating composition of the invention is composed of a coating agent selected from the group consisting of (a) an azetidinium polymer, (b) a guanidine polymer, (c) a mixture of an azetidinium polymer and a guanidine polymer, and (d) a copolymer of an azetidinium monomer and a guanidine monomer. In general, the coating agents have a colorant-reactive component, which is capable of reacting with a selected colorant, particularly a colorant having a nucleophilic and/or ionizable group, to form a coating agent-colorant complex through a covalent, electrostatic, or ionic association. The association of the coating agent and colorant imparts bleed resistance, water resistance (e.g., water-fastness), detergent resistance e.g., detergent-fastness), and other desirable characteristics to the printed, treated textile substrate. In addition to the coating agent, the coating compositions can include components such as film-forming binders, pigments, and other additives.

In general, the compositions can be readily prepared from commercially available starting materials and/or reagents, are compatible with additional binders or additives, can be used with a variety of base textile substrates, are compatible with a variety of printing methods, including conventional textile printing as well as digital printing methods (particularly inkjet printing, including drop-on-demand and continuous printing), and can also be used with existing commercial textile coating processes and equipment. The coating compositions are inexpensive to prepare, and relatively small amounts are required to provide a coated textile substrate having the advantageous features described herein. The coating compositions are also easy to handle due to their solubility in water (the active coating agents are hydrophilic polymers), and do not require the use of large volumes of organic solvents. The coating compositions also possesses good film-forming properties.

The treated textile substrates prepared using the coating compositions of the invention exhibit improved stability upon prolonged storage, and in some instances, improved durability, as evidenced by improved strength, e.g., tear strength. The treated textile substrate does not discolor or yellow, and maintains a high degree of brightness for extended periods of time. Textile substrates treated with the coating compositions of the invention react rapidly with a number of aqueous based colorants, thus providing a versatile coating system for use with a wide variety of available colorants. Furthermore, because the colorant reacts quickly with the coating compositions, the printed substrate does not require a separate curing step, but rather is fast-drying. This fast-drying characteristic provides for printed images that are "non-sticky," thus allowing the printed textile substrate to be handled immediately after printing, for example, to allow stacking. The treated textile substrate of the invention can also be used to prepare images with varying degrees of gloss, depending upon variations in pigment.

In addition to their water resistance, textile substrates treated with a coating composition of the invention are highly bleed-resistant (as evidenced by small dot size measurements, i.e., less wicking action), detergent-resistant and rub-resistant.

The various components of the coating compositions of the invention will now be described.

1. COATING AGENTS

Coating agents in the coating compositions of the invention generally comprise an azetidinium polymer, a guanidine polymer, a copolymer of an azetidinium monomer and a guanidine monomer, or a mixture of an azetidinium polymer and a guanidine polymer. In general, the coating agent represents approximately 1 wt. % to 100 wt. %, typically 50 wt. % to 95 wt. %, preferably 70 wt. % to 95 wt. % of the coating composition after drying on a substrate.

a) Azetidinium Polymers

In one embodiment, the coating agent is an azetidinium polymer. An "azetidinium polymer" is a polymer comprised of monomeric subunits containing a substituted or unsubstituted azetedine ring (i.e., a four membered nitrogen-containing heterocycle). In general, the azetidinium polymers useful herein are composed of monomer units having the structural formula (I):

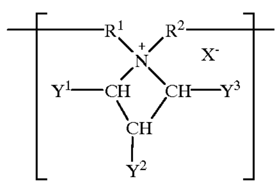

in which $R^1$ and $R^2$ are independently lower alkylene, $X^-$ is an anionic, organic or inorganic counterion, and $Y^1$, $Y^2$ and $Y^3$ are selected from the group consisting of hydrogen, hydroxyl, halo, alkoxy, alkyl, amino, carboxy, acetoxy, cyano and sulfhydryl. Preferred suchpolymers are wherein $R^1$ and $R^2$ are methylene, $X^-$ is selected from the group consisting of halide, acetate, methane sulfonate, succinate, citrate, malonate, fumarate, oxalate and hydrogen sulfate, $Y^1$ and $Y^3$ are independently hydrogen or lower alkyl, and $Y^2$ is hydrogen or hydroxyl. In particularly preferred azetidinium polymers herein, $Y^1$ and $Y^3$ are hydrogen and $Y^2$ is hydroxyl.

The azetidinium polymer may be a homopolymer, or it may be a copolymer, wherein one or more non-azetidinium monomer units are incorporated into the polymer structure. Any number of comonomers may be employed to form suitable azetidinium copolymers for use herein; however, a particularly preferred azetidinium copolymer is aminoamide azetidinium. Further, the azetidinium polymer may be essentially straight-chain or it may be branched or crosslinked.

Azetidinium polymers can associate with colorant in two different ways. First, the azetidinium polymer can associate with colorant through an ionic interaction, where the colorant provides anionic groups, such as carboxy or sulfonate, that can ion-exchange with the polymer counterions ($X^-$ in Formula (I), above), thus fixing the colorant to the textile substrate via an electrostatic-type interaction. Second, nucleophilic groups present within the colorant can react with the azetidinium groups of the polymer via a ring-opening reaction. A characteristic ring-opening reaction of an azetidinium polymer of the invention may be illustrated as follows:

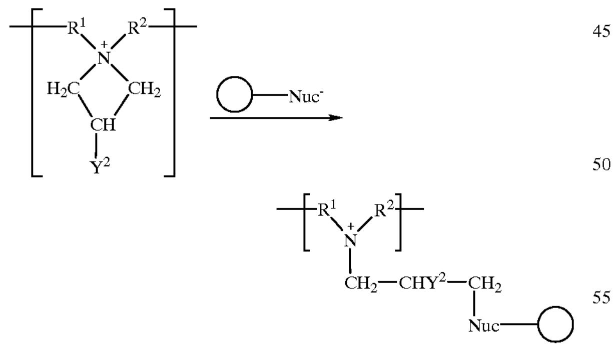

The colorant (○-$Nuc^-$) thus covalently bonds to the coating agent, to form a cross-linked coating agent-colorant complex. Colorant thus applied to a coated textile substrate is rapidly and irreversibly bound to the textile substrate.

The percentage of reactive azetidinium groups in the polymer can be adjusted in a controlled manner to tailor the number of reactive groups in the polymer. Azetidinium groups are insensitive to pH change; however, such groups are highly sensitive to the presence of anionic and nucleophilic species. In some cases, it may be desirable to adjust the reaction conditions used to prepare the azetidinium polymer (e.g., by raising the pH) to generate anionic groups within the polymer, which then participate in intramolecular crosslinking.

A preferred azetidinium polymer for use in the present invention is shown in Formula (II)

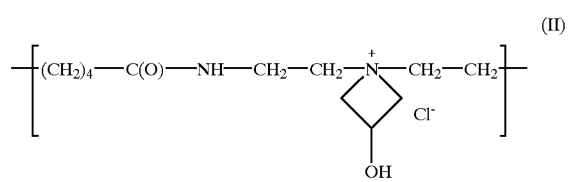

Commercially available such polymers include "AMRES®," available from Georgia Pacific Resins, Inc., Atlanta, Ga., "KYMENE®," from Hercules, Inc., Wilmington, Del., and "Polycup®," also from Hercules, Inc. These azetidinium polymers are generally referred to as poly(aminoamide)-epichlorohydrin (PAE) resins; such resins are typically prepared by alkylating a water-soluble polyamide containing secondary amino groups with epichlorohydrin. Other suitable azetidinium polymers will be known to those skilled in the art and/or are described in the pertinent texts, patent documents, and literature references; see, for example, Moyer, et al., in *WET STRENGTH IN PAPER AND PAPERBOARD*, Tappi Monograph Series No. 29, Tappi Press, Ch. 3, p. 33–37 (1965); Chan, in *TAPPI WET AND DRY STRENGTH SHORT COURSE*, Tappi Press, Atlanta, Apr. 13–15, 1988; and Espy, in *WET STRENGTH RESINS AND THEIR APPLICATION*, Ed., Lock L. Chan, Tappi Press, Atlanta, Ga. (1994).

(B) Guanidine Polymers

In another embodiment, the coating agent is a guanidine polymer, also termed a "polyguanidine." The guanidino group is extremely basic, possessing a pKa of about 12–13. Polyguanidines for use in the invention are typically provided as acid salts wherein the imine nitrogen atoms are for the most part in protonated form.

In general, guanidine polymers useful as coating agents in the present invention are either homopolymers or copolymers. All guanidine polymers herein are comprised of recurring monomer units having the structural formula

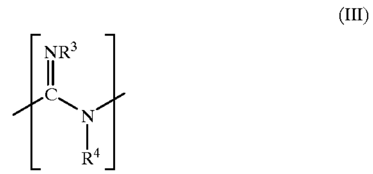

wherein $R^3$ is hydrogen or lower alkyl and $R^4$ is hydrogen, alkyl, alkoxy, or hydroxyl-substituted alkoxy. Preferably, $R^3$ and $R^4$ are hydrogen. Particularly preferred guanidine polymers for use herein are comprised of monomer units having the structural formula (IV)

(IV)

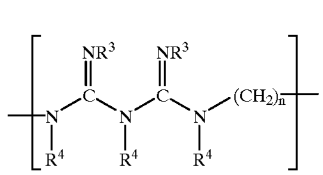

wherein n is an integer in the range of 1 to 10 inclusive, $R^3$ is hydrogen or lower alkyl and $R^4$ is hydrogen, alkyl, alkoxy, or hydroxyl-substituted alkoxy. Preferably, $R^3$ and $R^4$ are hydrogen.

A particularly preferred guanidine polymer for use in the methods and compositions of the invention has the structure of formula (IV) wherein $R^3$ and $R^4$ are H and n is 6 (3,12-diimino-2,4,11,13-tetraazatetradecanediimidamide), available under the tradenames "BAQUACIL®" and "VANTOCIL®," from Zeneca, Inc.

Polyguanidine polymers of the invention react electrostatically with anionic groups present in the dye via ion-exchange type interactions, to rapidly and irreversibly bind anionic type dyes to print textile substrates coated with such polymers.

(C) Mixtures of Azetidinium Polymers and Guanidine Polymers

In another embodiment, the coating agent comprises a mixture of an azetidinium polymer and a guanidine polymer. The two polymers may be present in any suitable ratio relative to one another. The relative amounts of polyguanidine and polyazetidinium can range from about 0.05% polyguanidine/99.95% polyazetidinium to 0.05% polyazetidinium/99.95% polyguanidine. The actual relative amounts of polyguanidine and polyazetidinium will vary according to the composition of the ink to be used (e.g., the nature of the colorant in the ink), the nature of the textile substrate, and other factors affecting the use of the polymers, such as the relative market price for each polymer. In general, it is preferable to use a smaller amount of guanidine relative to azetidinium.

In this embodiment, it is important that the pH of the coating composition be acidic, as the composition tends to gel at basic pH. If necessary, then, an acid should be added to the coating composition to ensure that the pH is below 7.0, preferably less than about 5.5, and most preferably in the range of about 1.0 to 5.5. Suitable acids include sulfuric acid, hydrochloric acid, acetic acid, and the like.

Although it will be appreciated that any of a number of azetidinium or guanidine polymers can be used to prepare the coating compositions and coated textile substrates described herein, a preferred polymer is a poly (aminoamide)-azetidinium polymer, e.g., a polyazetidinium chloride-based polymer, such as a polyamide-polyamine-epichlorohydrin resin.

(D) Copolymers of Azetidinium Monomers and Guanidine Monomers

In another embodiment, the coating agent is a copolymer of an azetidinium monomer unit and a guanidine monomer unit. In general, the azetidinium monomer unit has the structural formula (I)

(I)

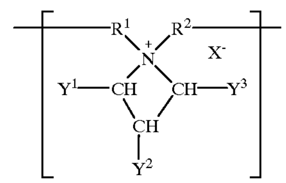

in which $R^1$ and $R^2$ are independently lower alkylene, $X^-$ is an anionic, organic or inorganic counterion, and $Y^1$, $Y^2$ and $Y^3$ are selected from the group consisting of hydrogen, hydroxyl, halo, alkoxy, alkyl, amino, carboxy, acetoxy, cyano and sulfhydryl. Preferred monomers are wherein $R^1$ and $R^2$ are methylene, $X^-$ is selected from the group consisting of halide, acetate, methane sulfonate, succinate, citrate, malonate, fumarate, oxalate and hydrogen sulfate, $Y^1$ and $Y^3$ are independently hydrogen or lower alkyl, and $Y^2$ is hydrogen or hydroxyl. In particularly preferred azetidinium monomers, $Y^1$ and $Y^3$ are hydrogen and $Y^2$ is hydroxyl. The guanidine monomer has the structural formula (III)

(III)

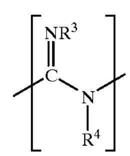

or the structural formula (IV)

(IV)

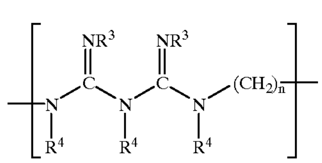

wherein $R^3$, $R^4$ and n are as defined earlier herein.

The ratio of azetidinium monomers to guanidine monomers in the copolymer, as well as the distribution of each monomer type in the copolymer, can be varied according to a number of factors, and may be, for example, tailored for use with specific colorants having certain types of ionic and/or nucleophilic groups. The precise composition of the copolymer may also be varied to best accommodate the nature of the textile substrate to be coated.

2. FILM-FORMING BINDERS

The textile coating compositions of the invention preferably include a film-forming binder. By "film-forming binder" is meant a substance that provides for improved strength of a textile substrate upon application of the substance to the substrate. "Film-forming binders" used in connection with the coating compositions of the invention include any film-forming binder that is compatible with the coating agent and other components of the composition. Exemplary film-forming binders include, but are not necessarily limited to: polysaccharides and derivatives thereof, e.g., starches, cellulosic polymers, dextran and the like; polypeptides (e.g., collagen and gelatin); and synthetic polymers, particularly synthetic vinyl polymers such as poly(vinyl alcohol), poly(vinyl phosphate), poly(vinyl pyrrolidone), vinyl-pyrrolidone-vinyl acetate copolymers, vinyl alcohol-vinyl acetate copolymers, vinyl pyrrolidone-styrene copolymers, and poly(vinylamine), and cationic film-forming binders such as quaternized vinyl pyrrolidone-dimethylaminoethyl-methacrylate copolymer, dimethylaminoethyl-methacrylate-co-methyl methacrylate, polydiallyldimethyl ammonium chloride and quaternized aminoacrylate polymers. The coating agents herein are themselves film-forming substances; however, it is generally desirable to use these coating agents with additional film-forming substances.

Polysaccharide binders: Starches, as noted above, represent one category of suitable film-forming binders for use herein. Suitable starches may be any of a variety of natural, converted, and synthetically modified starches. Exemplary starches include, but are not necessarily limited to starch (e.g., SLS-280 (St. Lawrence Starch)), cationic starches (e.g., Cato-72 (National Starch), hydroxyalkylstarch, wherein the alkyl has at least one carbon atom and wherein the number of carbon atoms is such that the material is water soluble, preferably from about 1 to about 10 carbon atoms, such as methyl, ethyl, propyl, butyl, or the like (e.g., hydroxypropyl starch #02382 (PolySciences, Inc.), hydroxyethyl starch #06733 (PolySciences, Inc.), Penford Gum 270 and 280 (Penford), and Film-Kote (National Starch)), starch blends (see, e.g., U.S. Pat. No. 4,872,951, describing a blend of cationic starch and starch treated with an alkyl or alkenyl succinic anhydride (ASA), preferably 1-octenyl succinic anhydride (OSA)), and the like. The film-forming binder can also be a synthetically produced polysaccharide, such as a cationic polysaccharide esterified by a dicarboxylic acid anhydride (see, e.g., U.S. Pat. No. 5,647,898). Additional saccharide binders include cellulosic materials such as alkyl celluloses, aryl celluloses, hydroxy alkyl celluloses, alkyl hydroxy alkyl celluloses, hydroxy alkyl celluloses, dihydroxyalkyl cellulose, dihydroxyalkyl cellulose, hydroxy alkyl hydroxy alkyl cellulose, halodeoxycellulose, amino deoxycellulose, dialkylammonium halide hydroxy alkyl cellulose, hydroxyalkyl trialkyl ammonium halide hydroxyalkyl cellulose, dialkyl amino alkyl cellulose, carboxy alkyl cellulose salts, cellulose sulfate salts, carboxyalkylhydroxyalkyl cellulose and the like). Still additional film-forming binders of this type include dextran (e.g., dialkyl aminoalkyl dextran, amino dextran, and the like), carrageenan, Karaya gum, xanthan, guar and guar derivatives, (e.g., carboxyalkyl hydroxyalkyl guar, cationic guar, and the like), and gelatin.

Additional exemplary film-forming binders include resins (e.g., such as formaldehyde resins such as melamine-formaldehyde resin, urea-formaldehyde resin, alkylated urea-formaldehyde resin, and the like ), acrylamide-containing polymers (e.g., poly(acrylamide), poly(N,N-dimethylacrylamide), and the like), poly(alkyleneimine)-containing polymers (e.g., poly(ethyleneimine), poly (ethyleneimine) epichlorohydrin, alkoxylated poly (ethyleneimine), and the like), polyoxyalkylene polymers (e.g., poly(oxymethylene), poly(oxyethylene), ethylene oxide/propylene oxide copolymers, ethylene oxide/2-hydroxyethyl methacrylate/ethylene oxide and ethylene oxide/hydroxypropyl methacrylate/ethyleneoxide triblock copolymers, ethylene oxide-4-vinyl pyridine/ethylene oxide triblock copolymers, ethylene oxide-isoprene/ethylene oxide triblock copolymers, epichlorohydrin-ethylene oxide copolymer, and the like), etc.

Any of the above exemplary film-forming binders can be used in any effective relative amounts, although typically the film-forming binder, if present, represents approximately 1 wt. % to 40 wt. %, preferably 1 wt. % to 25 wt. %, most preferably 1 wt. % to 15 wt. % of the composition, after drying on a textile substrate.

3. OTHER COMPONENTS OF THE TEXTILE COATING COMPOSITION

Additional coating composition components may include, but are not necessarily limited to, inorganic fillers, anti-curl agents, or additional conventional components such as a surfactant, plasticizer, humectant, UV absorber, light fastness enhancer, polymeric dispersant, dye mordant, optical brightener, fabric softener or leveling agent, as are commonly known in the art. Preferred additives are optical brighteners and fabric softeners, each of which generally represents approximately 0.5 wt. % to 2.0 wt. % of the coating composition after drying on a substrate. Illustrative examples of such additives are provided in U.S. Pat. Nos. 5,279,885 and 5,537,137. The coating compositions may also include a crosslinking agent, such as zirconium acetate, ammonium zirconium carbonate, or the like, for intramolecular and/or intermolecular crosslinking of coating agent (s) in the coating composition and/or a chelating agent such as boric acid. Additional components that may be desirable for use in the textile coating compositions of the invention will be known to those skilled in the art and/or described in the pertinent texts and literature.

The coating composition is preferably provided in an aqueous liquid vehicle, although small amounts of a water-soluble organic solvent may be present. The aqueous liquid vehicle will generally be water, although other nonorganic compounds that are either water soluble or water miscible may be included as well. It may on occasion be necessary to add a solubilizing compound during preparation of the coating composition so that the components dissolve in the aqueous liquid vehicle, e.g., an inorganic base such as ammonia and/or an organic amine. Suitable organic amines include lower alkyl-substituted amines such as methylamine, dimethylamine, ethylamine, and trimethylamine, as well as ethanolamine, diethanolamine, triethanolamine, and substituted ethanolamines, typically lower alkyl-substituted ethanolamines such as N-methyl and N,N-dimethyl ethanolamines, and morpholine. Such compounds are also useful for bringing the pH into the desired range for basic formulations, and, if present, will generally represent not more than about 20 wt. % of the composition, and in most cases will represent not more than about 10 wt. % of the composition.

Textile Substrates

In general, the textile coating compositions and printing methods of the invention can be used with any textile substrate amenable to use with such coating compositions and methods. Suitable textile substrates for use with the present invention include textiles having natural, synthetic, cellulose-based, or non-cellulose-based fibers or any combination thereof. Exemplary textile substrates include, but are not limited to, textiles having hydroxy group-containing fibers such as natural or regenerated cellulosic fibers (cotton, rayon, and the like); nitrogen group-containing fibers such as polyacrylonitrile; natural or synthetic polyamides (including wool, silk, or nylon); and/or fibers having acid-modified polyester and polyamide groups. The substrates may be additionally pre-treated or after-treated with resins or other substances compatible with the coating compositions and methods of the invention, and may be finished or unfinished. The textile substrate may also be sized prior to application of the present coating compositions. Alternatively, the present coating compositions may be incorporated into an external sizing process, so that sizing and coating is conducted in a single step.

The fibers of the textile substrate may be in any suitable form compatible with the selected printing process. e.g., loose yarns, or fabrics. Fabrics are a convenient and preferred form. The fibers may be blended with other fibers that are susceptible to treatment with a coating composition of the invention, or with fibers that may prove less susceptible to such treatment. The process may also be used with leather, vinyl and other natural or synthetic materials. Additional exemplary substrates for use in the invention include polyester films such as "MYLAR" flexible film, polysulfones, cellulose triacetates, and the like. Coated transparent films are also contemplated.

Application of the Coating Compositions to Textile Substrates

Coated textile substrates, also referred to herein as "treated textile substrates," can be prepared by any of a number of conventional coating processes commonly employed in the art. In general, the coating composition is applied to the textile substrate to provide a treated textile substrate in a manner that leaves the coating agent physically and chemically accessible to inks for reaction of the colorant-reactive coating agent within the colorant contained in the ink. The term "coating" as used herein encompasses both a surface coating as well as a coating that has infiltrated the textile to some degree, so long as, in the latter case, the coating agent is still accessible to colorant for printing.

The textile coating composition is applied to a textile substrate to achieve a desired coating layer thickness and/or to achieve delivery of a desired amount of coating composition to the textile substrate. The amount of coating composition used will vary with a number of factors, including, for example, the absorptive nature of the substrate, the ink to be used in printing on the substrate, the printing application to be used, and the like. In general, the coating composition is applied in an amount that results in a coating representing approximately 0.5 wt. % to 20 wt. % of the textile substrate after drying.

The coating is applied to at least one surface of the textile substrate, and may be applied to both a top and bottom surface of the substrate to facilitate printing on opposing substrate surfaces. The coating composition may also be applied by saturating a textile substrate. As will be appreciated by those skilled in the art, the coating compositions of the invention are applied by any suitable means, which may include continuous processes, application as a continuous film, padding, dipping, spraying, foam application, exhaust processes, or by using a rod, roll, flexopress, blade, or air-knife coater.

The coating composition may be applied to the textile substrate as a pretreatment, simultaneously with printing, or as an after-treatment. Preferably, the coating composition is applied to the substrate as a pretreatment, i.e., prior to printing.

The coated textile substrate described herein possesses advantageous features. For example, the coated textile substrate does not discolor or yellow. Additionally, the coating composition is compatible with a variety of textiles. Moreover, textile substrates coated with the coating compositions described herein react rapidly with applied aqueous colorants.

Preparation of Printed Images on Treated Textile Substrates

The coated textile substrates of the invention can be printed on using any suitable inks and any suitable printing method, e.g., conventional methods of printing, digital printing (e.g., inkjet printing, including drop on-demand and continuous jet printing), and the like.

In general, aqueous inks are used in the preparation of a printed image on the treated textile substrates of the invention. Aqueous inks for use in preparing a printed image may be any suitable ink having a colorant, e.g., a pigment, dye, or stain, having one or more reactive groups suitable for reacting, either covalently or ionically, with a colorant-reactive component of a coating agent in the coating of the treated textile substrate. The selection of the specific ink and colorant will vary with colorant-reactive component of the coating agent. For example, when the colorant-reactive component is an azetidinium group, the colorant has an anionic or nucleophilic group for reaction with the azetidinium group. When the colorant-reactive component is a guanidino group, the colorant has an anionic group for reaction with the guanidino group. Thus, preferred colorants for use in printing on a textile substrate coated with an azetidinium-containing coating composition are those containing one or more nucleophiles, e.g., having an amino, carboxy, sulfonato, thiosulfonato, cyano, hydroxy or sulfido group or the like. Preferred colorants for use in printing a treated textile substrate coated with a polyguanidine-containing coating composition are those containing an anionic group, e.g., having a carboxy, sulfonato, thiosulfonato, cyano, halo, or phosphonato group or the like.

The inks used in conjunction with the textile coating compositions of the invention may be inkjet inks. Water-soluble colorants in the inkjet inks may be acid dyes, direct dyes, basic dyes or dispersive dyes; preferred dyes are described in U.S. Pat. Nos. 5,425,805, 5,537,137, and 5,441,561.

The selection of the aqueous based ink will depend upon the requirements of the specific application, such as desired surface tension, viscosity, drying time, the type of textile substrate upon which the ink is to be applied (printing medium), and the like. The aqueous liquid vehicle of inks suitable for use in the invention will generally be water, although other nonorganic compounds which are either water soluble or water miscible may be included as well. The colorant may be dissolved, dispersed or suspended in the aqueous liquid vehicle, and is present in an amount effective to provide the dried ink with the desired color and color intensity.

In some instances, the dye is contained in a carrier medium composed of ink and a water soluble organic solvent. For applications utilizing such a carrier medium, representative solvents include polyhydridic alcohols such as polyethylene alcohol, diethylene glycol, propylene glycol, and the like. Additional solvents are simple alcohols such as ethanol, isopropanol and benzyl alcohol, and glycol ethers, e.g., ethylene glycol monomethyl ether, diethylene glycol monoethyl ether. Representative examples of water soluble organic solvents are described in U.S. Pat. No. 5,085,698 and U.S. Pat. No. 5,441,561.

Preferred colorants contained in the inks useful with the invention are dyes, including azo or "direct" dyes as well as dyes containing acidic groups (e.g., carboxylate, phosphonate or sulfonate moieties), basic groups (e.g., unsubstituted amines or amines substituted with 1 or 2 alkyl, typically lower alkyl, groups), or both. Specific examples of suitable colorants include, but are not limited to, the following: Dispersol Blue Grains (Zeneca, Inc.), Duasyn Acid Blue (Hoechst Celanese), Duasyn Direct Turquoise Blue (Hoechst Celanese), Phthalocyanine blue (C.I. 74160), Diane blue (C.I. 21180), Pro-jet Cyan 1 (Zeneca, Inc.), Pro-jet Fast Cyan 2 (Zeneca, Inc.), Milori blue (an inorganic pigment equivalent to ultramarine) as cyan colorants; Dispersol Red D-B Grains (Zeneca, Inc.), Brilliant carmine 6B (C.I. 15850), Pro-jet magenta 1 (Zeneca, inc.), Pro-jet Fast magenta 2 (Zeneca, Inc.), Brilliant Red F3B-SF (Hoechst Celanese), Red 3B-SF (Hoechst Celanese), Acid Rhodamine (Hoechst Celanese), Quinacridone magenta (C.I. Pigment Red 122) and Thioindigo magenta (C.I. 73310) as magenta colorants; Dispersol Yellow D-7G 200 Grains (Zeneca, Inc.), Brilliant yellow (Hoechst Celanese), Pro-jet yellow 1 (Zeneca, Inc.), Pro-jet Fast Yellow 2 (Zeneca, Inc.), benzidine yellow (C.I. 21090 and C.I. 21100) and Hansa Yellow (C.I. 11680) as yellow colorants; organic dyes; and black materials such as carbon black, charcoal and other forms of finely divided carbon, iron oxide, zinc oxide, titanium dioxide, and the like. Specific and preferred black colorants include Acid Black 48 (Aldrich), Direct Black 58756 A (Crompton & Knowles), BPI Molecular Catalytic Gray (Brain Power), Fasday Cool Gray (Hunter Delator), Dispersol Navy XF Grains (Zeneca, Inc.), Dispersol Black CR-N Grains (Zeneca, Inc.), Dispersol Black XF Grains (Zeneca, Inc.), Disperse Black (BASF), Color Black FW18 (Degussa), Color Black FW200 (Degussa), Hostafine Black TS (Hoechst Celanese), Hostafine Black T (Hoechst Celanese), Duasyn Direct Black (Hoechst Celanese), Pro-jet Black 1 (Zeneca, Inc.) and Pro-jet Fast Black 2 (Zeneca, Inc.).

Printed Textiles

The invention also features a printed, treated textile substrate produced using the methods and compositions described herein. The treated textile substrates of the invention can be printed using any suitable printing method, e.g., conventional methods of printing, digital printing, particularly inkjet printing, including drop on-demand printing and continuous jet printing, and the like. In one embodiment of particular interest, the treated textile substrates are printed by an inkjet printing method. In general, the printing process involves applying an aqueous recording liquid to a treated textile substrate in an imagewise pattern. Ink t printing processes are well known in the art; see, e.g., U.S. Pat. Nos. 4,601,777; 4,251,824; 4,410,899; 4,412,224; and 4,532,530.

The compositions of the invention make it possible to print the treated textile substrates of the invention using printing methods that are conventionally used in connection with cellulosic paper substrates. For example, printing and/or copying process using dry or liquid electrophotographic-type developers, such as electrophotographic processes, ionographic process, and the like, may be adapted for printing the treated textile substrates of the invention. The treated textile substrates of the invention can also be printed on using a process for generating images that involves generating an electrostatic latent image on an imaging member in an imaging apparatus, developing the latent image with a toner, and transferring the developed image to a treated textile substrate of the invention. Electrophotographic processes are known in the art; see, e.g., U.S. Pat. No. 2,297,691. Ionographic and electrographic processes are also well known in the art, see, e.g., U.S. Pat. No. 3,611,419, 3,564,556; 4,240,084; 4,569,584; 2,919,171; 4,524,371; 4,619,515; 4,463,363; 4,254,424; 4,538,163; 4,409,604; 4,408,214; 4,365,549; 4,267,556; 4,160,257; and 4,155,093.

The printing process using treated textiles does not require a separate curing step. For example, reaction of the colorant-reactive component of the coating agent in the coating composition with the colorant in the ink can occur at room temperature. However, exposure of the printed, coated textile substrate to heat (e.g., using conventional heat press processes) will speed the reaction of the dye with the coating agent.

After printing, the printed, coated textile substrates can be further treated using any compositions and processes that are compatible with the coating agents and coated textile substrates described herein.

Characteristics of Printed Images

The printed, treated textile substrates as described herein interact rapidly and, in most cases, non-reversibly with a number of aqueous based dyes, providing a versatile medium for use with a wide variety of aqueous dyes. The printed, treated substrates are also water-resistant and bleed-resistant (as evidenced by small dot size measurements, i.e., less wicking action) and maintain a high degree of brightness for extended periods of time. Printed images formed upon the treated textile substrate are also fast-drying. Moreover, the coating composition can be used to prepare images with varying degree of gloss, depending upon variations in pigment.

Images printed upon a treated textile substrate of the type described herein can be analyzed for any of a number of representative features using standard analytical techniques to obtain measurements for optical density, water-fastness, chroma and hue (via LAB graphs), dot size, and the like. As can be seen on the basis of the results below, upon application of ink with an inkjet printer, substrates treated with a variety of coating compositions in accordance with the invention result in superior print images which are clear, durable, highly luminant, non-feathered, and water-resistant and/or water-fast.

In addition, images printed on treated textile substrates according to the present invention are also detergent resistant and/or detergent-fast. The detergent to which the images are resistant include a variety of commercially available detergents, (e.g., anionic detergents, cationic detergents, non-ionic detergents, amphoteric detergents, etc.). Anionic detergents to which the printed, treated textile substrates are resistant include, but are not necessarily limited to, alkyl aryl sulfonates (e.g., linear alkyl benzene sulfonate), alkyl aryl condensates (e.g., DDB (dodecyl benzene)), long chain (fatty) alcohol sulfates (e.g., having a chain of 12 to 18 carbon atoms), olefin sulfates and sulfonates, alpha olefin sulfate and sulfonates, sulfate monoglycerides, sulphate ethers, sulfosuccinates, alkane sulfonates, phosphate esters, alkyl isothionates, and sucrose esters.

EXPERIMENTAL

The following examples are put forth so as to provide those of ordinary skill in the art with a complete disclosure and description of how to prepare and use the compounds disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in °C. and pressure is at or near atmospheric.

Also, in these examples, unless otherwise stated, the abbreviations and terms employed have their generally accepted meanings. Abbreviations and tradenames are as follows (note that suppliers of each material are indicated as well):

Amres=azetidinium polymer (Georgia Pacific);

Gaufquat-755=cationic film-forming binder (ISP);

Gum 280=starch (Penford);

ISP 937=polyvinylpyrrolidone-dimethylaminomethacrylate (ISP);

Polectron=styrene/poly(vinyl pyrrolidone) copolymer (Polectron 430, ISP Technologies);

Polycup=azetidinium polymer;

PVOH=polyvinyl alcohol (Airvol 523S, Air Products);

PVP=polyvinyl pyrrolidone (Aldrich);

Sif=fumed silica (Aerosil MOX 170, Degussa);

Sip=precipitated silica (FK3 10, Degussa);

Tinopal=brightener (Ciba Additives);

Vantocil=3,1 2-diimino-2,4, 11,13-tetraazatetradecanediimidamide, 20% aqueous solution (Vantocil IB, Zeneca, Inc.).

All patents, patent applications, journal articles and other references mentioned herein are incorporated by reference in their entireties.

EXAMPLE 1

PolyAzetidinium-Based Textile Coatings

The following table summarizes exemplary textile coating compositions in accordance with the invention, wherein the coating agent is an azetidinium polymer. Each of the representative formulations was used to coat and/or saturate cotton and cotton/polyester blend fabrics, which were then printed on using an aqueous ink and an inkjet printer. The printed textile substrates so prepared were found to have the beneficial features described herein, i.e., with respect to bleeding, wicking and brightness of printed images, as well as water resistance and rub resistance.

EXAMPLE 2

PolyGuanidine-Based Textile Coatings

The following table summarizes exemplary textile coating compositions in accordance with the invention, wherein the coating agent is a polyguanidine or an azetidinium polymer, or wherein the coating agent comprises a mixture of a polyguanidine and an azetidinium polymer. Each of the representative formulations was used to coat and/or saturate cotton and cotton/polyester blend fabrics, which were then printed on using an aqueous ink and an inkjet printer. The printed textile substrates so prepared were found to have the beneficial features described herein, i.e., with respect to bleeding, wicking and brightness of printed images, as well as water resistance and rub resistance.

TABLE 1

POLYAZETIDINIUM-BASED TEXTILE COATINGS

| Formulation No. | Starch (Gum 280) | Azetidinium ("Amres") | Binder (PVOH) | Styrene/PVP ("Polectron") | Pigment 1:4 Sif:Sip | % Solids | Viscosity, cP | pH |
|---|---|---|---|---|---|---|---|---|
| 84-1 | 53 | 20 | 7.0 | | 20.0 | 14.5 | | |
| 85-1 | 52.5 | 20 | 7.0 | | 20.0 | 14.6 | | |
| 74-2 | 22 | 38 | 8.0 | | 32.0 | 13.3 | | |
| 74-3 | 22 | 40 | 10.0 | | 28.0 | 13.3 | 335 | 3.82 |
| 74-4 | 10 | 50 | 10.0 | | 25.0 | 13.3 | | |
| 79-1 | 13 | 50 | 11.0 | | 26.0 | 16.3 | | 3.75 |
| 71-2 | 22 | 36 | | 9.4 | 32.8 | 25.3 | | 3.74 |
| 76-1 | 22 | 38 | 6.0 | 2.0 | 32.0 | 13.3 | 348 | 3.73 |
| 76-2 | 22 | 36 | 6.0 | 4.0 | 32.0 | 13.3 | | |
| 74-1 | 22 | 33 | 8.0 | 5.0 | 32.0 | 13.3 | 479 | 3.86 |
| 76-3 | 22 | 34 | 6.0 | 6.0 | 32.0 | 13.3 | 286 | 3.73 |
| 77-3 | 22 | 35 | 5.0 | 6.0 | 32.0 | 13.3 | | |
| 77-2 | 22 | 34 | 5.0 | 7.0 | 32.0 | 13.3 | 250 | 3.73 |
| 72-2 | 22 | 33 | 5.0 | 8.0 | 32.0 | 23.1 | | 3.74 |
| 78-2 | 22 | 33 | 5.0 | 8.0 | 32.0 | 14.1 | 667 | 4.0 |
| 77-4 | 22 | 38 | 10.0 | 10.0 | 20.0 | 13.1 | | 3.79 |
| 79-2 | 35 | 10 | 10.0 | 10.0 | 35.0 | 18.8 | | 4.10 |
| 77-1 | 27.5 | 47.5 | 12.5 | 12.5 | | 10.8 | | 3.75 |
| 78-1 | 22 | 33 | 5.0 | 8.0 | 32 | 15.4 | 182 | 6.70 |
| 90-1 | 23 | 30 | 10.0 | | 35 | 14.5 | | |
| 90-2 | 23 | 30 | 10.0 | | 35 | 14.7 | | |
| 90-3 | 23 | 30 | 10.0 | | 35 | 13.4 | | |
| 90-4 | 23 | 30 | 10.0 | | 35 | 14.5 | | |

TABLE 2

| POLYGUANIDINE AND/OR POLYAZETIDINIUM-BASED TEXTILE COATINGS | | | | | | | | | |
|---|---|---|---|---|---|---|---|---|---|
| Formulation No. | Starch (Gum 280) | Azetidinium ("Amres") | Polyguanidine ("Vantocil") | Binder (PVOH) | Styrene/PVP ("Polectron") | Pigment 1:4 Sif:Sip | Solids (%) | Tinopal | pH |
| 46-2 | 45 | | 17 | 10 | | 28.0 | 14.2 | | |
| 79-3 | 45 | | 17 | 10 | | 28.0 | 17.6 | | 4.71 |
| 84-3 | 54 | 10 | 5 | 8 | | 22.5 | 15.2 | | |
| 84-2 | 60 | 10 | 5 | 5 | | 20.0 | 14.8 | | |
| 83-3 | 46 | 15 | 2 | 7 | | 30.0 | 16.4 | | |
| 83-2 | 40 | 20 | 3 | 7 | | 30.0 | 16.5 | | |
| 83-1 | 37 | 25 | 5 | 5 | | 28.0 | 16.4 | | |
| 73-1 | 10 | 50 | 5 | 10 | | 25.0 | 24.0 | | 3.94 |
| 73-2 | 35 | 5 | 5 | 10 | 10 | 35.0 | 18.1 | | 4.40 |
| 88-1 | 50 | 10 | 5 | 5 | | 30 | 14.5 | | 6.61 |
| 88-2 | 50 | 10 | 5 | 5 | | 30.0 | 14.5 | | 6.62 |
| 89-3 | 25 | 10 | 10 | 5 | 5 | 40 | 16.2 | 5.0 | |
| 89-2 | 38 | 12.4 | 4.8 | 9.5 | 4.8 | 28.6 | 14.3 | 1.90 | |
| 88-3 | 55 | 10 | 5 | 5 | | 23 | 14.0 | 2.0 | |
| 89-1 | 40 | 13 | 5 | 10 | | 30 | 13.8 | 2.0 | |
| 51-5 | 60 | | 40 | | | | 12.5 | | |
| 52-1 | 50 | | 50 | | | | 13.3 | | |
| 55-2 | | 71.4 | | 14.3 | | | 6.0 | | |
| 55-3 | | 85.5 | | 17.1 | | | 5.4 | | |
| 51-4 | | | 25 | 25 | | 50 | 20.0 | | |
| 53-4 | | 90 | 10 | | | | 6.0 | | |
| 53-1 | | 73.7 | 26.3 | | | | 4.8 | | |
| 53-2 | | 54.5 | 22.7 | 22.7 | | | 5.5 | | |
| 54-4 | | 71.4 | 14.3 | 14.3 | | | 6.6 | | |
| 57-1 | | 71 | 14 | 14 | | | 6.6 | | |

EXAMPLE 3

Fabrics were treated with textile coating compositions of the invention as follows:

(a): Fabric cotton was soaked in an aqueous formulation containing 2% DETA (diethylene triamine) solution, 0.1% fabric softener and 0.1% brightener, for 0.5 h and allowed to drip dry.

(b): Fabric cotton treated as in (a) was soaked in an aqueous composition containing a 5% solution of Polycup 172, 0.1% fabric softener and 0.1% brightener, for 0.5 h and allowed to drip dry.

(c): Fabric cotton was soaked in an aqueous formulation containing 2% DETA and 12.5% Polycup, for 0.5 h and allowed to dry.

(d): Fabric cotton was soaked in an aqueous formulation containing 2% DETA, 12.5% Polycup, and a pH-adjusting agent to bring the pH to approximately 5. After 0.5 h, the fabric was removed and allowed to dry.

(e): Polycup 172, 8 g (64 ml), and ISP 937, 2 g (20 ml), were diluted in water to provide a 5% solution. Fabric softener (0.1%) and brightener (0.1%) were added. Fabric cotton and 100% cotton were soaked in this solution, removed after 0.5 h, and allowed to drip dry.

(f): Polycup 172, 8 g (6 ml), and Gaufquat 755, 2 g (10 ml) were mixed and diluted in water to provide a 5% solution. Cotton and fabric cotton were soaked in the solution, removed after 0.5 h, and allowed to drip dry.

(g): Fabric cotton was soaked in a 1% polyethyleneimine solution for 15 min, squeezed and then allowed to drip dry. The dried cloth was then soaked in a 5% Polycup solution and allowed to drip dry after squeezing.

(h): Fabric cotton was soaked in 1% DETA solution, then squeezed and allowed to drip dry.

(i): Fabric cotton was soaked in a 5% aqueous solution of Polycup 172, 0.1% fabric softener and 0.1% brightener.

(j): A 5% solution of Amres was made by diluting Amres HS 30 (30% solution). 0.1% each of fabric softener and brightener were added. The surfactant Surfinol FS 85 was added to the formulation as well.

(k): A formulation containing Polycup 172+ Gaufquat 755 (7:3) was prepared and made slightly acidic. Nylon Banner material was soaked in the solution and allowed to drip dry.

The treated fabrics were allowed to dry, and were then printed on using an aqueous ink and an inkjet printer. The printed fabrics pre-treated with the compositions of the invention were found to be water-fast and bleed-resistant, with the printed images of superior quality with respect to chroma and hue.

What is claimed is:

1. A process for producing a treated textile substrate, comprising the step of applying to the surface of a textile substrate a coating composition containing a coating agent selected from the group consisting of (a) a mixture of an azetidinium polymer and a guanidine polymer, (b) a copolymer of an azetidinium monomer and a guanidine monomer, and (c) a poly(aminoamide)-epichlorohydrin resin.

2. The process of claim 1, wherein the coating agent comprises a mixture of an azetidinium polymer and a guanidine polymer.

3. The process of claim 2, wherein the azetidinium polymer is comprised of monomer units having the structural fornulla

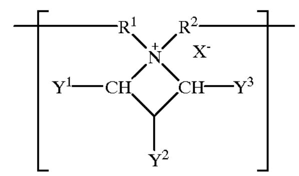

in which $R^1$ and $R^2$ are independently $C_{1-6}$ alkylene, $X^-$ is an anionic, organic or inorganic counterion, and $Y^1$, $Y^2$ and $Y^3$ are selected from the group consisting of hydrogen, hydroxyl, halo, alkoxy, alkyl, amino, carboxy, acetoxy, cyano, and suilfhydryl.

4. The process of claim 3, wherein the guanidine polymer is comprised of monomer units having the structural formula

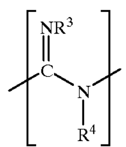

wherein $R^3$ is hydrogen or $C_{1-6}$ alkyl and $R^4$ is hydrogen, alkyl, alkoxy, or hydroxyl-substituted alkoxy.

5. The process of claim 4, wherein, in the guanidine polymer, $R^3$ and $R^4$ are hydrogen.

6. The process of claim 3, wherein the guanidine polymer is comprised of monomer units having the structural formula

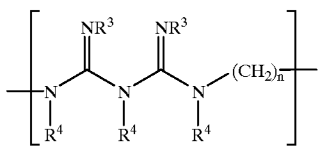

wherein n is an integer in the range of 1 to 10 inclusive, $R^3$ is hydrogen or $C_{1-6}$ alkyl and $R^4$ is hydrogen, alkyl, alkoxy, or hydroxyl-substituted alkoxy.

7. The process of claim 6, wherein, in the guanidine polymer, $R^3$ and $R^4$ are hydrogen.

8. The process of claim 3, wherein, in the azetidinium polymer, $R^1$ and $R^2$ are methylene, $X^-$ is selected from the group consisting of halide, acetate, methane sulfonate, succinate, citrate, malonate, fumarate, oxalate, and hydrogen sulfate, $Y^1$ and $Y^3$ are independently hydrogen or $C_{1-6}$ alkyl, and $Y^2$ is hydrogen or hydroxyl.

9. The process of claim 8, wherein the guanidine polymer is comprised of monomer units having the structural formula

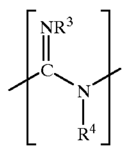

wherein $R^3$ is hydrogen or $C_{1-6}$ alkyl and $R^4$ is hydrogen, alkyl, alkoxy, or hydroxyl-substituted alkoxy.

10. The process of claim 9, wherein, in the guanidine polymer, $R^3$ and $R^4$ are hydrogen.

11. The process of claim 8, wherein the guanidine polymer is comprised of monomer units having the structural formula

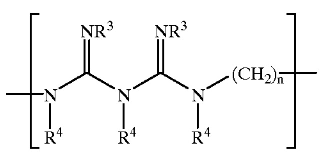

wherein n is an integer in the range of 1 to 10 inclusive, $R^3$ is hydrogen or $C_{1-6}$ alkyl and $R^4$ is hydrogen, alkyl, alkoxy, or hydroxyl-substituted alkoxy.

12. The process of claim 11, wherein, in the guanidine polymer, $R^3$ and $R^4$ are hydrogen.

13. The process of claim 8, wherein, in the azetidinium polymer, $Y^1$ and $Y^3$ are hydrogen and $Y^2$ is hydroxyl.

14. The process of claim 13, wherein the guanidine polymer is comprised of monomer units having the structural formula

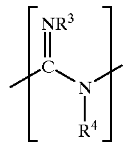

wherein $R^3$ is hydrogen or $C_{1-6}$ alkyl and $R^4$ is hydrogen, alkyl, alkoxy, or hydroxyl-substituted alkoxy.

15. The process of claim 14, wherein, in the guanidine polymer, $R^3$ and $R^4$ are hydrogen.

16. The process of claim 13, wherein the guanidine polymer is comprised of monomer units having the structural formula

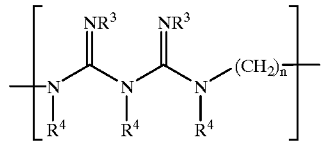

wherein n is an integer in the range of 1 to 10 inclusive, $R^3$ is hydrogen or $C_{1-6}$ alkyl and $R^4$ is hydrogen, alkyl, alkoxy, or hydroxyl-substituted alkoxy.

17. The process of claim 16, wherein, in the guanidine polymer, $R^3$ and $R^4$ are hydrogen.

18. The process of claim 1, wherein the coating agent is comprised of a copolymer of an azetidinium monomer unit and a guanidine monomer unit.

19. The process of claim 18, wherein the azetidinium monomer unit has the structural formula

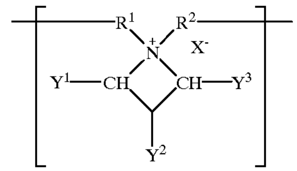

in which $R^1$ and $R^2$ are independently $C_{1-6}$ alkylene, $X^-$ is an anionic, organic or inorganic counterion, and $Y^1$, $Y^2$, and $Y^3$ are selected from the group consisting of hydrogen, hydroxyl, halo, alkoxy, alkyl, amino, carboxy, acetoxy, cyano, and sulfhydryl, and the guanidine monomer unit has the structural formula

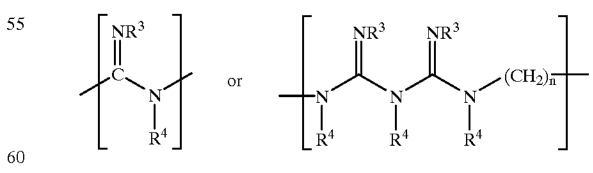

wherein n is an integer in the range of 1 to 10 inclusive, $R^3$ is hydrogen or $C_{1-6}$ alkyl and $R^4$ is hydrogen, alkyl, alkoxy, or hydroxyl-substituted alkoxy.

20. The process of claim 19, wherein, in the azetidinium monomer unit, $R^1$ and $R^2$ are methylene, $X^-$ is selected from the group consisting of halide, acetate, methane sulfonate, succinate, citrate, malonate, fumarate, oxalate, and hydrogen sulfate, $Y^1$ and $Y^3$ are independently hydrogen or $C_{1-6}$ alkyl, and $Y^2$ is hydrogen or hydroxyl.

21. The process of claim 1, wherein the coating composition is aqueous.

22. The process of claim 1, wherein the coating composition further comprises a colorant.

23. The process of claim 22, wherein the colorant is a pigment.

24. The process of claim 23, wherein the pigment is selected from the group consisting of silica, titanium dioxide and calcium carbonate.

25. The process of claim 22, wherein the colorant is a dye.

26. The process of claim 1, wherein the coating composition is applied in an amount that results in a coating representing approximately 0.5 wt. % to 20 wt. % of the textile substrate after drying.

27. The process of claim 1, wherein the coating agent represents approximately 1 wt. % to 100 wt. % of the coating composition, based upon total solids weight of the coating composition after drying.

28. A textile substrate treated by the process of claim 1.

29. A textile substrate treated by the process of claim 2.

30. A textile substrate treated by the process of claim 18.

31. A method for providing a water-resistant printed image on a textile substrate, comprising:

applying to a textile substrate a coating composition comprised of a coating agent selected from the group consisting of (a) a mixture of an azetidinium polymer and a guanidine polymer, (b) a copolymer of an azetidinium monomer and a guanidine monomer, and (c) a poly(aminoamide)-epichlorolhydrin resin, thereby producing a treated textile substrate; and applying a colorant composition to the treated textile substrate, wherein the colorant composition contains a coating agent reactive colorant having ionizable and/or nucleophilic groups.

32. A printed textile product prepared by the method of claim 31.

33. The printed textile product of claim 32, wherein the printed image is water-resistant and detergent-resistant.

34. The process of claim 1, wherein the coating agent is a poly(aminoamide)-epichlorohydrin resin.

35. The method of claim 31, wherein the coating agent is a poly(aminoamide)-epichlorohydrin resin.

36. The process of claim 1, further including, prior to application of the coating composition, pretreating the substrate with a pretreatment agent.

37. The process of claim 36, wherein the pretreatment agent is a resin.

38. The process of claim 36, wherein the pretreatment agent is a sizing agent.

39. The process of claim 31, further including, prior to application of the coating composition, pretreating the substrate with a pretreatment agent.

40. The process of claim 39, wherein the pretreatment agent is a resin.

41. The process of claim 39, wherein the pretreatment agent is a sizing agent.

* * * * *